(12) United States Patent
Muto

(10) Patent No.: US 9,936,090 B2
(45) Date of Patent: Apr. 3, 2018

(54) PRINTING APPARATUS, CONTROL METHOD FOR THE PRINTING APPARATUS, AND STORAGE MEDIUM

(71) Applicant: CANON KABUSHIKI KAISHA, Tokyo (JP)

(72) Inventor: Tsuyoshi Muto, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/835,502

(22) Filed: Aug. 25, 2015

(65) Prior Publication Data

US 2016/0062712 A1 Mar. 3, 2016

(30) Foreign Application Priority Data

Aug. 28, 2014 (JP) .................................. 2014-174493
Jul. 13, 2015 (JP) .................................. 2015-140044

(51) Int. Cl.
*H04N 1/00* (2006.01)

(52) U.S. Cl.
CPC ..... *H04N 1/00734* (2013.01); *H04N 1/00708* (2013.01); *H04N 1/00724* (2013.01)

(58) Field of Classification Search
USPC ....................................................... 358/1.13
See application file for complete search history.

(56) References Cited

U.S. PATENT DOCUMENTS

| | | | | |
|---|---|---|---|---|
| 2002/0138697 A1* | 9/2002 | Kanda | ................... | G06F 3/0613<br>711/114 |
| 2005/0099510 A1* | 5/2005 | Nakazono | .............. | H04N 5/772<br>348/231.3 |
| 2007/0086041 A1* | 4/2007 | Richtsmeier | ......... | H04N 1/4406<br>358/1.15 |
| 2008/0018934 A1* | 1/2008 | Kuroki | ................... | G06K 15/02<br>358/1.16 |
| 2013/0083352 A1* | 4/2013 | Kato | .................. | H04N 1/00474<br>358/1.15 |

FOREIGN PATENT DOCUMENTS

| | | |
|---|---|---|
| CN | 1885891 A | 12/2006 |
| CN | 103037123 A | 4/2013 |
| JP | 2006-135702 A | 5/2006 |
| JP | 2013-123093 A | 6/2013 |

OTHER PUBLICATIONS

Yoshiomi et al., Image Reading Apparatus and Image Forming Device, Jun. 20, 2013, Machine Translated Japanese Patent Application Publication, JP2013123093 listed on IDS, all pages.*

* cited by examiner

*Primary Examiner* — Ngon Nguyen
(74) *Attorney, Agent, or Firm* — Canon USA, Inc. I.P. Division

(57) ABSTRACT

One or more printing apparatuses, one or more control methods for same and one or more storage mediums are provided herein. A control method in or for a printing apparatus according to at least one embodiment includes reading an image of an original document and generating image data, storing the generated image data in a storing unit (e.g., of the printing apparatus), reading out the image data stored in the storing unit and printing the image on a sheet on the basis of the image data, and controlling the printing apparatus in a manner that: (i) the reading of the image is started before a storage area for storing the image data generated by the reading is secured by the storing unit, and (ii) the image data generated by the reading is stored in the storing unit after the storage area is secured by the storing unit.

6 Claims, 9 Drawing Sheets

| NUMBER OF PIXELS IN MAIN SCANNING DIRECTION (pixel) |
|---|
| NUMBER OF LINES IN SUB SCANNING DIRECTION (line) |

| COLOR MODE |
|---|
| SCALING FACTOR (%) IN X DIRECTION |
| SCALING FACTOR (%) IN Y DIRECTION |
| READING RESOLUTION (pixel/inch) |
| OUTPUT RESOLUTION (pixel/inch) |
| ROTATION ANGLE (degrees) |
| OTHER FUNCTION SETTINGS |

PRINTING APPARATUS, CONTROL METHOD FOR THE PRINTING APPARATUS, AND STORAGE MEDIUM

BACKGROUND OF THE INVENTION

Field of the Invention

The present disclosure relates to a printing apparatus configured to print an image on a sheet, a control method for the printing apparatus, and a storage medium.

Description of the Related Art

Up to now, two systems including a stream reading system and an optical system moving system have been proposed as a method of reading an image of an original document. According to the stream reading system, an original document is placed on a document tray, and an image of an original document is read at a position of a fixed optical system while the original document is conveyed by an auto document feeder (ADF). On the other hand, according to the optical system moving system, an original document is placed on a platen glass (document positioning plate), and an image of an original document is read by moving the optical system while a position of the original document is fixed.

A technology has been proposed for shortening a time until an image is output to a sheet on the basis of image data generated by reading an original document of the first page (which will be referred to as first copy out time: FCOT) in a case where the image of the original document is read by way of the optical system moving system.

Japanese Patent Laid-Open No. 2006-135702 describes an image forming apparatus configured to determine whether or not a setting content of a job is relevant to an FCOT mode after a start button is pressed. When it is determined that the setting content is relevant to the FCOT mode, this image forming apparatus transmits an FCOT activation signal to an image input unit and an image output unit connected via a control line. The image input unit that has received the FCOT activation signal performs wait operations (such as movement of a carriage and corrections of black level variation and white level variation) prior to image input processing. Subsequently, when reception of parameters (magnification, scan size, resolution, and the like) for the image input unit, which have been transmitted via a communication line, has finished, this image forming apparatus starts reading operation.

Reading of an image of an original document is started after a storage area for storing image data generated by reading the image of the original document is secured, and therefore the FCOT is delayed. In the image forming apparatus described in Japanese Patent Laid-Open No. 2006-135702, since the wait operations (such as the movement of the carriage and the corrections of the black level variation and the white level variation) are performed prior to the image input processing, it is possible to shorten the FCOT. However, the reading of the image of the original document is not started until the reception of all the parameters for the image input unit which have been generated from the setting content of the job is ended, and the storage area is secured.

SUMMARY OF THE INVENTION

At least one embodiment of a printing apparatus, according to an aspect of the present disclosure, includes: a reading unit configured to read an image of an original document and generate image data; a storing unit configured to store the image data generated by the reading unit; a printing unit configured to read out the image data stored in the storing unit and print an image on a sheet on a basis of the image data; and a controlling unit configured to perform a control in a manner that: (i) the reading of the image of the original document by the reading unit is started before a storage area for storing the image data generated by the reading unit is secured by the storing unit, and (ii) the image data generated by the reading is stored in the storing unit after the storage area is secured by the storing unit.

According to other aspects of the present disclosure, one or more additional printing apparatuses, one or more control methods for same and one or more storage mediums are discussed herein. Further features of the present disclosure will become apparent from the following description of exemplary embodiments with reference to the attached drawings.

BRIEF DESCRIPTION OF THE DRAWINGS

FIG. 8 illustrates an example of a value set in a register of a scanner I/F according to the first exemplary embodiment.

FIG. 9 illustrates an example of a value set in a register of an image processing circuit according to the first exemplary embodiment.

DESCRIPTION OF THE EMBODIMENTS

Hereinafter, exemplary embodiments of the present disclosure will be described in detail with reference to the accompanying drawings. It is noted that the following exemplary embodiments are not designed to limit the present disclosure related to the scope of the claims, and not all of combinations of characteristics described in the exemplary embodiments of the present disclosure are necessarily indispensable to address the issue(s) of the present disclosure.

First Exemplary Embodiment

A printing apparatus according to a first exemplary embodiment will be described by using FIG. 1 and FIG. 2.

Figure 1:
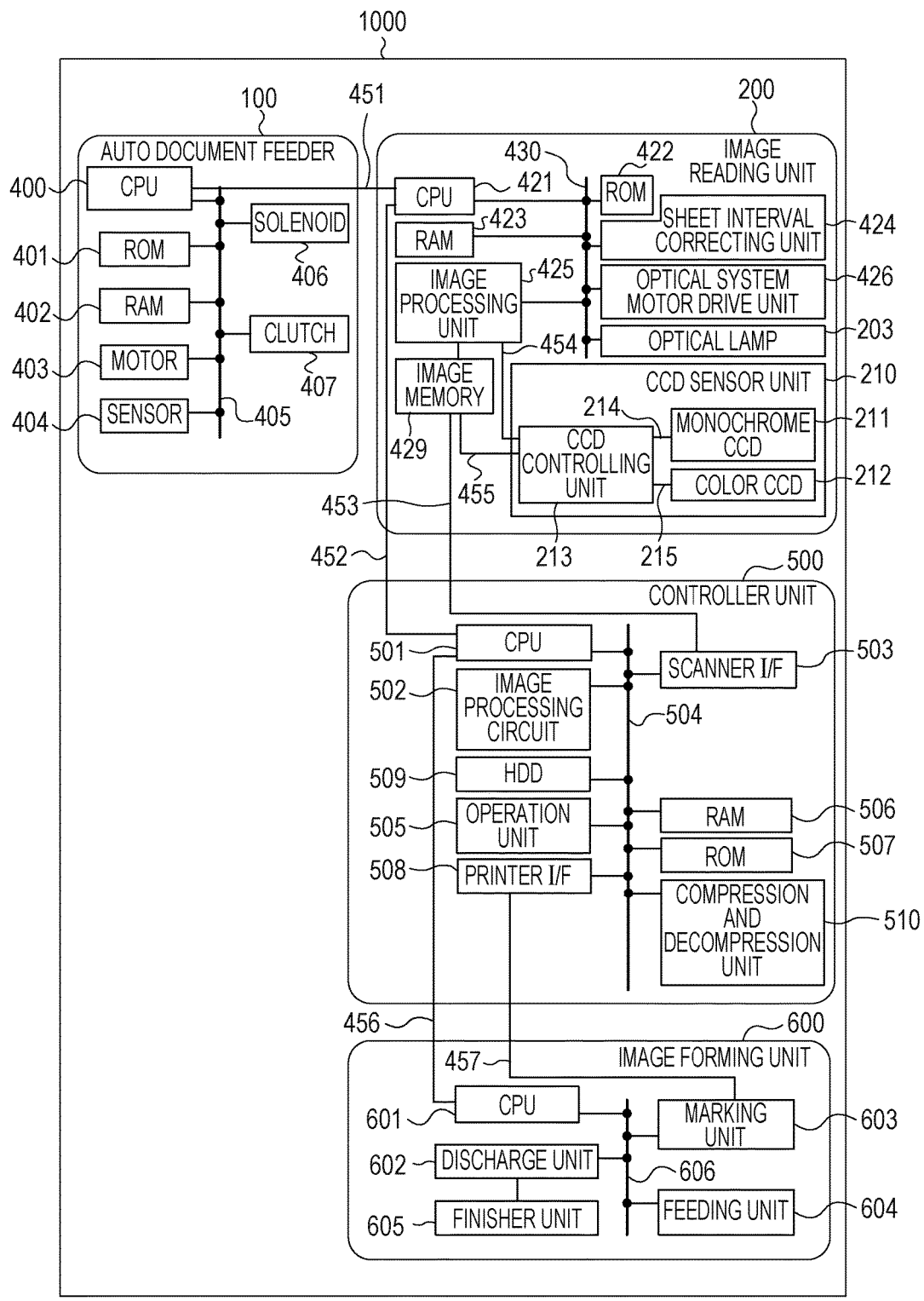
FIG. 1 is a block diagram illustrating a configuration of an MFP according to a first exemplary embodiment.

FIG. 1 is a block diagram illustrating a configuration of an MFP 1000 according to the present exemplary embodiment. FIG. 2 is a cross sectional view illustrating a configuration of the MFP 1000 according to the present exemplary embodiment.

According to the present exemplary embodiment, a CPU 501 of a controller unit 500 determines a size of a storage area for storing image data, generated by reading an image of an original document, in a RAM 506 on the basis of setting information of a job. Subsequently, the CPU 501 instructs a CPU 421 of an image reading unit 200 to start the reading of the image of the original document before the determined storage area is secured in the RAM 506. Subsequently, the CPU 501 stores the image data, generated by the reading, in the RAM 506 after the determined storage area is secured in the RAM 506. As a result, it is possible to shorten the FCOT.

Hereinafter, details of one or more embodiments of the present disclosure will be described.

A printing apparatus according to the present exemplary embodiment is, for example, the MFP 1000 provided with an image reading function of reading an image of an original document and generating image data, and provided with a printing function (copying function) of printing the image on a sheet on the basis of the generated image data. MFP refers to a multi functional peripheral. It is noted that the MFP 1000 may be provided with a printing function (PC printing function) of receiving a printing job from an external apparatus, such as a PC, and printing a character or an image on a sheet on the basis of this printing job.

As illustrated in FIG. 1, the MFP 1000 includes an auto document feeder (ADF) 100 which will be described below, the image reading unit 200, the controller unit (controlling unit) 500, and an image forming unit 600. These components are electrically connected to one another and mutually transmit and receive control commands and data.

Control Block of the ADF 100

The ADF 100 is provided with a CPU 400, a ROM 401, a RAM 402, an output port, and an input port as a plurality of function blocks. These components are electrically connected to one another via a bus line 405 and mutually transmit and receive the control commands and the data.

A motor 403 for driving various conveying rollers, a solenoid 406, and a clutch 407 are connected to the output port. Various sensors 404 such as an original document detection sensor (not illustrated) configured to detect that an original document 32 is placed on a document tray 30 illustrated in FIG. 2 are all connected to the input port.

The ROM 401 is a read-only memory and stores a control program and a fixed parameter in advance. The RAM 402 is a memory where read and write can be performed and stores input data and working data.

The CPU 400 controls conveyance of the original document 32 (see e.g., FIG. 2) in accordance with the control program stored in the ROM 401. The CPU 400 also performs a serial communication with the CPU 421 of the image reading unit 200 via a control communication line 451 and transmits and receives control data with the ADF 100 and the image reading unit 200. The CPU 400 also transmits a signal representing a page start of the image data of the original document 32 to the image reading unit 200 via the control communication line 451.

Control Block of the Image Reading Unit 200

The image reading unit 200 is provided with the CPU 421, a ROM 422, a RAM 423, a sheet interval correcting unit 424, an image processing unit 425, an optical system motor drive unit 426, an optical lamp 203, and a CCD sensor unit 210 as a plurality of function blocks. CCD refers to a charge coupled device. These components are electrically connected to one another via a control bus line 430 and mutually transmit and receive the control commands and the data. It is noted that, in the CCD sensor unit 210, a monochrome image reading CCD 211 (also referred to as a monochrome CCD 211) configured to read the image of the original document in black and white is connected to a CCD controlling unit 213 via an image data communication line 214 including a clock signal line for the image transfer. In addition, in the CCD sensor unit 210, a color image reading CCD 212 (also referred to as a color CCD 212) configured to read the image of the original document in color is connected to the CCD controlling unit 213 via an image data communication line 215 including the clock signal line for the image transfer.

The ROM 422 is a read-only memory and stores a program in advance. The RAM 423 is a memory where read and write can be performed and provides a work area including an area where nonvolatile storage is performed.

The sheet interval correcting unit 424 is a unit configured to correct an interval of the original document(s) 32 conveyed by the ADF 100. The image processing unit 425 is a unit configured to perform various image processings such as shading correction on the image data generated by the reading of the image of the original document.

The CPU 421 performs a control of the conveyance of the original document 32 by the ADF 100 and a control of the reading of the image of the original document 32 by the image reading unit 200. For example, the CPU 421 transmits a command related to the control of the conveyance of the original document 32 via the control communication line 451 and instructs the CPU 400 to control the conveyance of the original document 32. Subsequently, the CPU 400 instructed to control the conveyance of the original document 32 performs the control to monitor the various sensors 404 installed on a conveying path and drive the motor 403 for the conveyance, the solenoid 406, and the clutch 407 so as to convey the original document 32.

For example, the CPU 421 also controls the optical system motor drive unit 426 corresponding to a driver circuit configured to drive an optical system driving monitor. In addition, for example, the CPU 421 controls the image processing unit 425 connected on the control bus line 430.

Furthermore, for example, the CPU 421 transmits the control signal to the CCD sensor unit 210 from a control communication line 454 via the image processing unit 425 to control the CCD sensor unit 210. Details of one or more embodiments thereof will be described below. During a process of scanning the image of the original document by the CCD sensor unit 210, an image signal is formed on the CCD sensor unit 210 (either the color image reading CCD 212 or the monochrome image reading CCD 211) by a lens 207. Subsequently, an analog image signal read for each line by the CCD sensor unit 210 is output to the CCD controlling unit 213 from the image data communication line 214 or the image data communication line 215. Subsequently, the CCD controlling unit 213 converts the analog image signal into digital image data. Subsequently, the image processing unit 425 performs various image processings on the converted image data, and thereafter, the CPU 421 writes the image data in an image memory 429 via an image data communication line 455 including the clock signal line for the image transfer.

The CPU 421 transmits the image data written in the image memory 429 to the controller unit 500 via an image data communication line 453 of a controller interface including the clock signal line for the image transfer. The CPU 421 also transmits a signal representing a page start of the image data of the original document to the controller unit 500 via a control communication line 452 of the controller interface to adjust a transfer timing of the image data.

In addition, the CPU 421 similarly transmits a signal representing a page start of the image data notified from the ADF 100 via the control communication line 451 to the controller unit 500 via the control communication line 452.

Control Block of the Controller Unit 500

The controller unit 500 includes the CPU 501, an image processing circuit 502, a scanner I/F 503, an operation unit 505, the RAM 506, a ROM 507, a printer I/F 508, an HDD 509, and a compression and decompression unit 510 as a plurality of function blocks. These components are electrically connected to one another via a bus controller 504 and mutually transmit and receive the control commands and the data.

The CPU 501 controls processings, operations, and the like of the auto document feeder 100, the image reading unit 200, the image forming unit 600, and various units of such units (e.g., a feeding unit 604 and the like).

The RAM 506 is a memory where read and write can be performed and stores the image data transmitted from the image reading unit 200, various programs, setting information, and the like. It is noted that the RAM 506 provides a work area also including an area where non-volatile storage is performed. It is noted that the RAM 506 is, for example, a dynamic random access memory (DRAM).

The ROM 507 is a read-only memory and stores programs such as boot sequence and font information in advance.

The HDD 509 stores plural pieces of data such as system software, setting information of the job, print data of the job, the image data converted into an RGB signal by the image processing circuit 502 which will be described below, and image data compressed by the compression and decompression unit 510 which will be described below. It is noted that, according to the present exemplary embodiment, the HDD 509 will be described as an example of a large-capacity and non-volatile storage apparatus, but the configuration is not limited to this. A non-volatile memory such as a solid state drive (SSD) may be used. For example, in one or more embodiments, the non-volatile memory may be used when the non-volatile memory operates as a large-capacity and non-volatile storage apparatus.

The ROM 507 or the HDD 509 stores various control programs used for executing various processings (one or more embodiments of which are described herein in discussion of flow charts) executed by the CPU 501 which will be described below. The ROM 507 or the HDD 509 also stores a display control program for causing a display unit of the operation unit 505, which will be described below, to display various user interface screens (will be referred to as user interface (UI) screens below). The CPU 501 reads out the program stored in the ROM 507 or the HDD 509 and executes various operations related to the present exemplary embodiment by decompressing this program in the RAM 506.

The scanner I/F 503 is an interface for connecting the controller unit 500 to the image reading unit 200. In the scanner I/F 503, the image data is cut out for the number of lines in accordance with a register value in the scanner I/F 503. It is noted that examples of the register value in the scanner I/F 503 include a number of pixels in a main scanning direction (pixel) and a number of lines in a sub scanning direction (line) as indicated by a register 800 of FIG. 8.

The printer I/F 508 is an interface for connecting the controller unit 500 to the image forming unit 600. The controller unit 500 performs control and conversion of synchronous system/asynchronous system of the image data through the scanner I/F 503 or the printer I/F 508.

The CPU 501 transmits the signal representing the page start of the image data which is received from the image reading unit 200 to the image forming unit 600 via the control communication line 456 of the controller interface to adjust the transfer timing. Subsequently, the CPU 501 transmits the image data written in the RAM 506 to the image forming unit 600 via the printer I/F 508 through an image data communication line 457 of the controller interface including the clock signal line for the image transfer.

The image processing circuit 502 executes the image conversion processing on the image data stored in the RAM 506 in accordance with the register value in the image processing circuit 502 and thereafter stores the converted image data in the RAM 506 again. It is noted that examples of the register value in the image processing circuit 502 include a color mode, a scaling factor (%) in the X direction, a scaling factor (%) in the Y direction, a reading resolution (pixel/inch), an output resolution, a rotation angle (degrees), and other function settings as indicated by a register 900 of FIG. 9.

The image conversion processings performed by the image processing circuit 502 include rotation processing for rotating an image in units of 32 pixels×32 pixels at a specified angle, resolution conversion processing for converting the resolution of the image, scaling processing for setting the scaling factors of the image, matrix arithmetic processing for the multi-valued input image, and color space conversion processing. The color space conversion processing refers to processing of converting a YUV image into an Lab image by a look up table (LUT), and background removal and strike-through averting in related art can be carried out by this color space conversion.

The compression and decompression unit 510 includes an image processing block configured to perform processing of compressing and decompressing the image data or the like stored in the RAM 506 or the HDD 509 by way of various compression systems such as JBIG and JPEG and storing the image data in the RAM 506 or the HDD 509 again.

Figure 4:
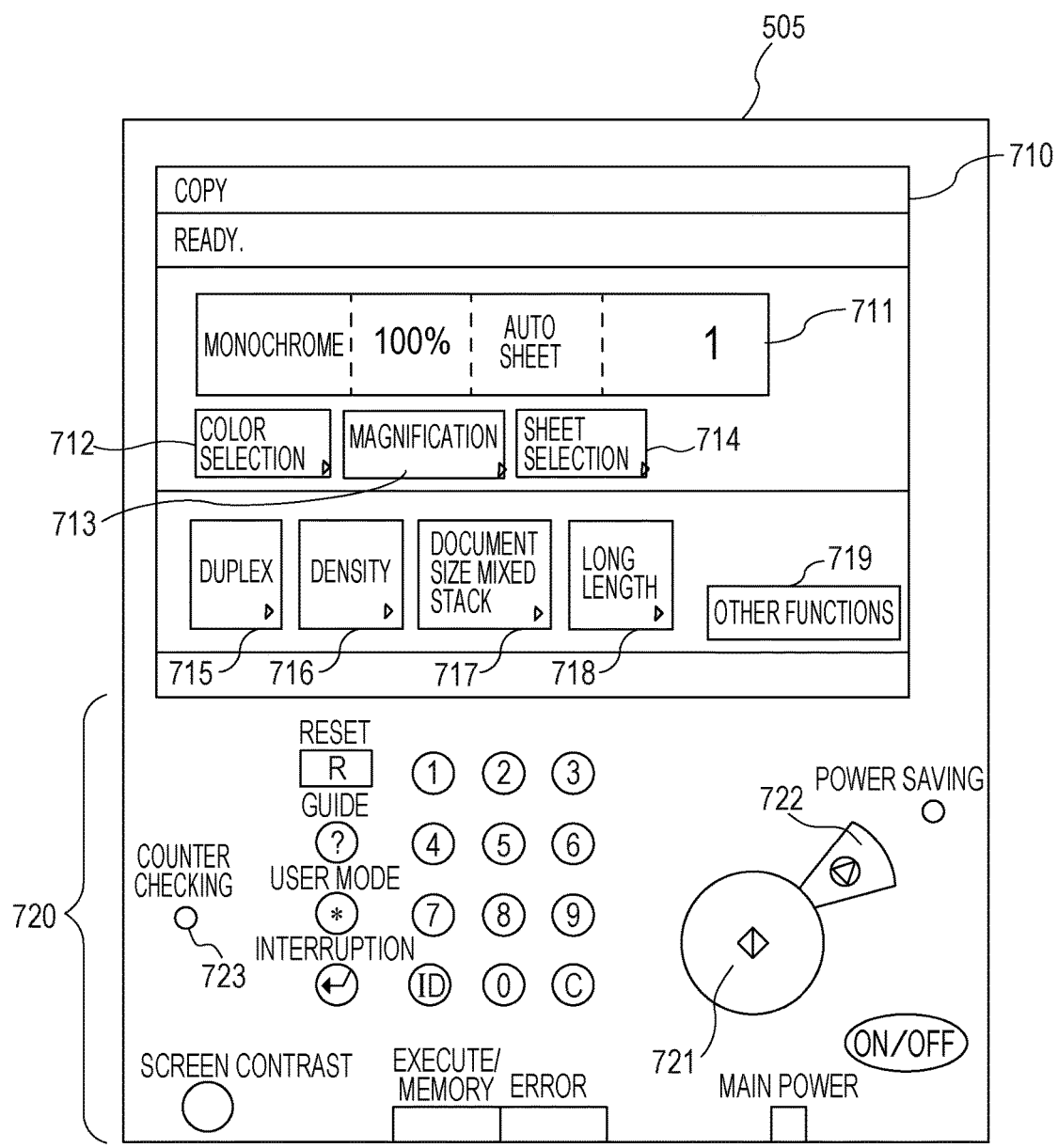
FIG. 4 is a top view of an operation unit of the MFP according to the first exemplary embodiment.

The operation unit 505 is relevant to an example of a user interface unit. FIG. 4 is a top view of the operation unit 505. As illustrated in FIG. 4, the operation unit 505 includes a display unit 710 and a key input unit 720. In addition, the operation unit 505 has a function of accepting various settings from a user via the display unit 710 or the key input unit 720. The operation unit 505 also has a function of providing information to the user via the display unit 710.

It is noted that the display unit 710 is constituted as a touch panel sheet including a liquid crystal display (LCD) and transparent electrodes affixed on the LCD (which may be of a capacitance system). Buttons for setting a number of copies 711, a color selection 712, magnification 713, and sheet selection 714 are arranged in the LCD as examples of basic settings for copying. As settings other than the basic settings for copying, for example, the user can set page printing, page aggregation, binding, and the like by pressing a button for setting other functions 719. It is noted that a shortcut button can be created on a copy screen for a function frequently used by the user among the settings other than the basic settings for copying. For example, buttons for duplex 715 for setting duplex printing, density 716 for setting the printing density, original document size mixed stack 717 for reading the original documents having different sizes, long length 718 for reading the original document having a length longer lengthwise or crosswise than a formatted size, and the like are arranged. It is noted that various pieces of setting information for copying which are input by the user from an operation screen or the like of the LCD are stored in the HDD 509. The operation screen for these buttons and a state of the MFP 1000 are displayed on the LCD.

The key input unit 720 is constituted by a plurality of hard keys. The hard keys include, for example, a start key 721 for instructing execution of the job, a stop key 722 for instructing abort of the currently executed job, a counter checking key 723 for displaying a total number of sheets on which the printing has been performed so far (number of output sheets) on the LCD, and the like.

A signal input by the touch panel or the hard key is transmitted to the CPU 400.

Control Block of the Image Forming Unit 600

The image forming unit 600 includes a CPU 601, a discharge unit 602, a marking unit 603, the feeding unit 604, and a finisher unit 605 as a plurality of function blocks. These components are electrically connected to one another via a bus controller 606 and mutually transmit and receive the control commands and the data.

The feeding unit 604 is constituted by a plurality of cassettes for holding sheets 301 used for printing and a manual feeding tray. The marking unit 603 is a unit configured to perform transfer and fixing of a toner image formed on the basis of the image data on the sheet 301 fed from the feeding unit 604 and form (print) the image on the sheet 301 by using the toner. It is noted that details of the transfer and the fixing will be described below by using FIG. 2. The discharge unit 602 is a unit configured to discharge the sheet 301 on which the image has been formed to an area outside the machine. The finisher unit 605 is a unit configured to perform post processings such as shifting processing, stapling processing, punching processing, and sorting processing.

The CPU 601 controls the image forming unit 600. For example, in a case where the marking unit 603 completes preparations for the image formation, the CPU 601 transmits a signal representing page start of the image data to the controller unit 500 via a control communication line 456 of the controller interface to adjust a transfer timing. Subsequently, the marking unit 603 performs the transfer and the fixing of the toner image on the basis of the image data transmitted via the image data communication line 457 of the controller interface.

Configuration Example of the ADF 100

Operation of the ADF 100 will be described by at least one embodiment of the ADF 100 illustrated in FIG. 2. The ADF 100 includes the document tray 30 on which a sheaf or stack of original documents constituted by one or more of the original documents 32 are disposed, a separation pad 21 that regulates exit toward downstream while the sheaf or stack of the original documents protrudes from the document tray 30 before the start of the conveyance of the original document 32, and the feeding roller 1.

The feeding roller 1 drops onto an original document surface of the sheaf or stack of the original documents placed on the document tray 30 and rotates. As a result, the original document 32 on the uppermost surface of the sheaf or stack of the original documents is fed. The original document 32 fed by the feeding roller 1 is separated into one sheet among the original documents 32 by actions of a separation roller 2 and the separation pad 21. This separation is realized by a retard separation technique in related art.

The original document 32 separated by the separation roller 2 and the separation pad 21 is conveyed to a registration roller 4 by a conveying roller pair 3. Subsequently, the conveyed original document 32 abuts against the registration roller 4. As a result, the original document 32 is formed into a loop shape, and skew in the conveyance of the original document 32 is cancelled. A feeding path is arranged in the downstream side of the registration roller 4. The original document 32 that has passed through the registration roller 4 is conveyed through the feeding path in a direction of a stream reading glass 201.

The original document 32 fed through the feeding path is fed onto a platen by a large roller 7 and a feeding roller 5. Herein, the large roller 7 comes in contact with the stream reading glass 201. The original document 32 fed by the large roller 7 passes through a conveying roller 6 and moves between a roller 16 and a movement glass. Subsequently, the original document 32 is discharged to an original document discharge tray 31 via a discharge flapper and a discharge roller 8.

The ADF 100 can read an image on a rear surface of the original document 32 by reversing the original document 32. Specifically, the discharge roller 8 is reversed to switch the discharge flapper in a stage in which the original document 32 is engaged with the discharge roller 8, and the original document 32 is moved to a reversing path 19. The moved original document 32 abuts against the registration roller 4 from the reversing path 19, and the original document 32 is formed into a loop shape again, so that skew in the conveyance of the original document 32 is cancelled. Thereafter, the original document 32 is moved to the stream reading glass 201 again by the feeding roller 5 and the large roller 7, and the image on the rear surface of the original document 32 can be read by the stream reading glass 201.

A guide regulating plate 15 that can slide in the sub scanning direction of the sheaf or stack of the stacked original documents is provided to the document tray 30, and an original document width detection sensor (not illustrated) configured to detect an original document width in conjunction with the guide regulating plate 15 is also provided. A size of the original document 32 of the sheaf or stack of the original documents stacked on the document tray 30 can be determined by a combination of this original document width detection sensor and a pre-registration sensor 11. In addition, an original document length can be detected by an original document length detection sensor (not illustrated) provided in the conveying path on the basis of a conveyance distance from leading end detection to rear end detection of the currently conveyed original document 32. The size of the original document 32 can also be determined from a combination of the detected original document length and the above-described original document width detection sensor.

Configuration Example of the Image Reading Unit 200

Figure 2:
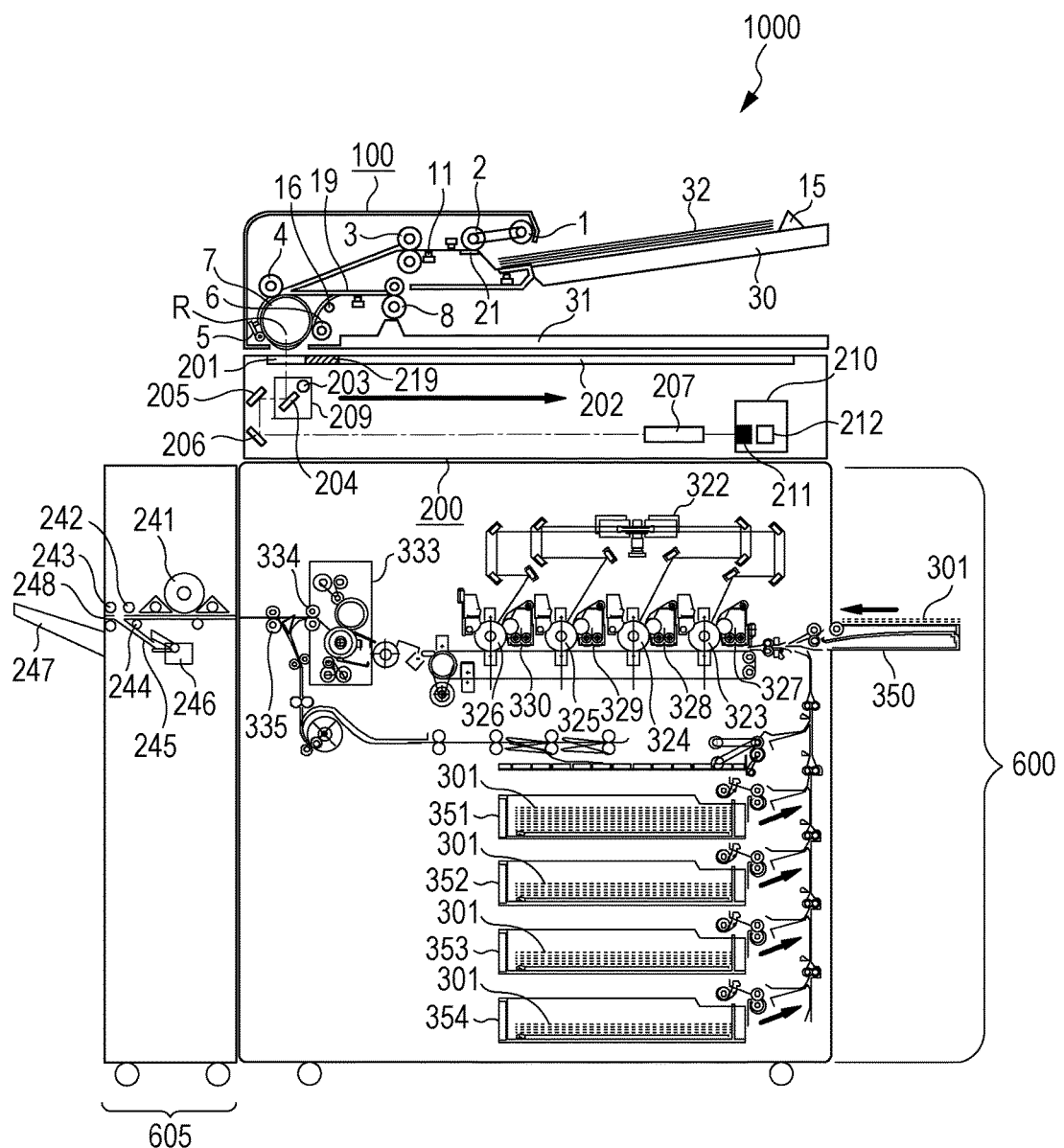
FIG. 2 is a cross sectional view illustrating a configuration of the MFP according to the first exemplary embodiment.

With regard to an original document 32 on a platen glass 202, the image reading unit 200 optically reads image information recorded on the original document while an optical scanner unit 209 performs scanning in the sub scanning direction indicated by an arrow of FIG. 2. With regard to the original documents 32 on the ADF 100, each sheet of the original documents 32 on the document tray 30 is conveyed to a reading center position. Furthermore, the optical scanner unit 209 is moved to reach the reading center position of the large roller 7 of the ADF 100, and the original document 32 is read by the reading center position of the large roller 7. The original document 32 on the ADF 100 or the original document on the platen glass 202 is read by the next optical system. This optical system is provided with the stream reading glass 201, the platen glass 202, the optical scanner unit 209 including the optical lamp 203 and a mirror 204, mirrors 205 and 206, the lens 207, and the CCD sensor unit 210. According to the present exemplary embodiment, the CCD sensor unit 210 is constituted by the color image reading (RGB) CCD (three-line sensor unit) 212 and the monochrome image reading CCD (one-line sensor unit) 211.

The image information read by this optical system is photoelectrically converted and input to the controller unit 500 as image data. It is noted that a white board 219 is used for creating reference data of a white level by shading.

It is noted that, according to the present exemplary embodiment, the descriptions have been given of a case where the optical system provided to the image reading unit 200 is a reduction optical system in which reflected light from the original document is imaged on the CCD sensor, but the configuration is not limited to this. The optical system provided to the image reading unit 200 may be an equal magnification optical system in which the reflected light from the original document is imaged on a contact image sensor (CIS).

Subsequently, the arrangement of the sensors configured to detect the size of the original document stacked on the platen glass 202 will be described by using a top view of the platen glass 202 illustrated in FIG. 3.

The optical scanner unit 209 is a unit configured to detect the size of the original document 32 in the main scanning direction. Reflection-type sensors 220 and 221 are sensors configured to detect the size of the original document 32 in the sub scanning direction.

When the ADF 100 is opened by the user to set the original document 32 on the platen glass 202, the CPU 421 detects that the ADF 100 is opened. Subsequently, the CPU 421 causes the optical scanner unit 209 to move to a position where the set original document 32 can be read.

Figure 3:
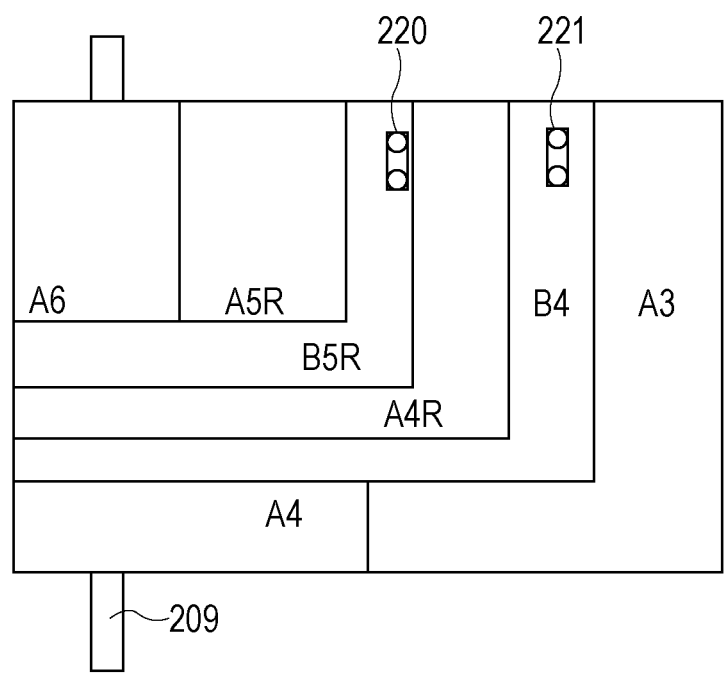
FIG. 3 is a top view of a platen glass of the MFP according to the first exemplary embodiment.

The size of the original document 32 stacked on the platen glass 202 in the sub scanning direction is detected by the plurality of reflection-type sensors 220 and 221 arranged as illustrated in FIG. 3. The reflection-type sensors 220 and 221 emit infrared light from light emitting units from a bottom side of the platen glass 202 and receive reflected light from the original document 32 by light receiving units to detect an approximate length in the sub scanning direction of the original document 32.

Subsequently, in a case where the CPU 421 detects a state in which the ADF 100 is being closed when the user starts to perform an operation for closing the ADF 100, the optical lamp 203 is turned on to illuminate the original document 32. Subsequently, the monochrome image reading CCD 211 (or the color image reading CCD 212) reads a certain line of the original document 32 in the main scanning direction. With regard to the light from the optical lamp 203, a part where the light is shielded and reflected by the original document 32 and a part where the reflected light is not shielded and returned since the original document 32 does not exist are detected, and end parts of the original document 32 are detected by the detection results. Since the original document size of the formatted size can be confirmed by the thus detected length in the main scanning direction and the length in the sub scanning direction to some extent, the original document size is confirmed.

A reason why the detection is performed to such an extent that the length in the sub scanning direction can be classified into an approximate length is that the length in the main scanning direction can be precisely detected to some extent.

For example, in a case where the length in the main scanning direction for the A4 size can be detected as the length in the main scanning direction, when both the reflection-type sensors 220 and 221 in the sub scanning direction detect the reflected light from the original document, this size can be confirmed as the A3 size. When both the reflection-type sensors 220 and 221 do not detect the reflected light, this size can be confirmed as the A4 size. According to the present exemplary embodiment, the case has been described where the size is confirmed by detecting the size of the read original document 32 by the sensors 220 and 221, but the configuration is not limited to this. In the MFP 1000 that is not provided with a sensor configured to detect the size of the read original document, the size may be confirmed while the user inputs the size of the read original document 32 from the operation unit 505.

Configuration Example of the Image Forming Unit 600

Subsequently, an operation (printing operation) of outputting an image to the sheet 301 on the basis of the image data transmitted (transferred) to the image forming unit 600 will be described below.

The image data transmitted (transferred) to the image forming unit 600 is converted into laser light by a laser unit 322 in accordance with the image data. Subsequently, photosensitive drums 323 to 326 are irradiated with this laser light, and electrostatic-latent images in accordance with the image data are formed on the photosensitive drums 323 to 326. Toner is adhered to parts corresponding to the latent images of the photosensitive drums 323 to 326 by developing units 327 to 330. It is noted that a color printer is provided with four each of photosensitive drums 323 to 326 and developing units 327 to 330 for cyan, yellow, magenta, and black.

The image forming unit 600 is also provided with the feeding unit 604, and the feeding unit 604 includes cassettes 351 to 354 and a manual feeding tray 350 as a sheet holding unit (also referred to as sheet feeding deck). It is noted that the cassettes 351 to 354 have a slide-out shape and can hold the plurality of sheets 301 (for example, 600 sheets). On the other hand, the manual feeding tray 350 has a plug-in shape and can hold the plurality of sheets sheet 301 (for example, 100 sheets).

The image forming unit 600 feeds the sheet 301 from any one of the cassettes 351 to 354 and the manual feeding tray 350. Subsequently, with respect to the fed sheet 301, the toner adhered to the photosensitive drums 323 to 326 is transferred to the sheet 301, and thereafter, the sheet 301 is conveyed to a fixing unit 333. Subsequently, the toner is fixed onto the sheet 301 by heat and pressure. The sheet 301 that has passed through the fixing unit 333 is conveyed to the finisher unit 605 by conveying rollers 334 and 335.

The sheet conveyed to the finisher unit 605 is first fed to a buffer unit 241 of the finisher unit 605. Herein, the conveyed sheet is wound around a buffer roller to perform buffering in accordance with the case. For example, in a case where the stapling processing or the like that is to be performed in the downstream thereof takes time, it is possible to adjust a conveyance interval of the sheets conveyed from the main body by using the buffer unit 241. Thereafter, the sheet passes through a conveying path 244 by an upstream discharging roller pair 242 and a downstream discharging roller pair 243 to be stacked on a stack tray 245.

When the sheaf or stack of sheets for one set of copies are stacked on the stack tray 245, the sheaf or stack of stacked sheets pass through a conveying path 248 and are discharged to a discharging tray 247 functioning as a discharge unit.

In a case where the shifting is specified, the sheaf of sheets stacked on the stack tray 245 are discharged to the discharging tray 247 functioning as the discharge unit while being shifted with respect to the sheaf or stack of sheets discharged immediately before, so that it becomes easier for the user to find a break between the copies. On the other hand, in a case where the stapling is specified, a stapling unit 246 performs stapling processing on the sheaf of sheets that are conveyed by the upstream discharging roller pair 242 and pass via the conveying path 244 by the downstream discharging roller pair 243 to be stacked on the stack tray 245. The sheaf of stapled sheets are discharged to the discharging tray 247 by the downstream discharging roller pair 243.

It is noted that, in the MFP 1000 that is not provided with the finisher unit 605, the sheet that has passed through the fixing unit 333 may be directly discharged to the discharging tray 247 by the conveying rollers 334 and 335. In addition, in the MFP 1000 that is not provided with the discharging tray 247 functioning as the discharge unit, the sheet that has passed through the fixing unit 333 may be discharged into a barrel functioning as the discharge unit.

It is noted that the descriptions have been given of a case where the MFP 1000 according to the present exemplary embodiment is the color printer provided with four each of the photosensitive drums 323 to 326 and the developing units 327 to 330, but the configuration is not limited to this. The subject aspect(s) of the present disclosure can be similarly applied to the MFP 1000 even when the MFP 1000 is a monochrome printer provided with one each of the photosensitive drum and the developing unit. In addition, the method of printing the image on the sheet 301 by way of an electrophotographic system in the MFP 1000 according to the present exemplary embodiment has been described, but the configuration is not limited to this. As long as the image can be printed on the sheet 301, for example, an ink-jet method or the like may be adopted, and the other method (for example, a thermal-transfer system or the like) may also be adopted.

According to the present exemplary embodiment, the CPU 501 of the controller unit 500 determines a size of the storage area for storing the image data generated by reading the image of the original document in the RAM 506 on the basis of the setting information of the job. Subsequently, the CPU 501 instructs the CPU 421 of the image reading unit 200 to start the reading of the image of the original document before the determined storage area is secured in the RAM 506. Subsequently, the CPU 501 stores the image data generated by the reading in the RAM 506 after the determined storage area is secured in the RAM 506. As a result, it is possible to shorten the FCOT.

Details of one or more embodiments thereof will be described below.

Figure 5A:
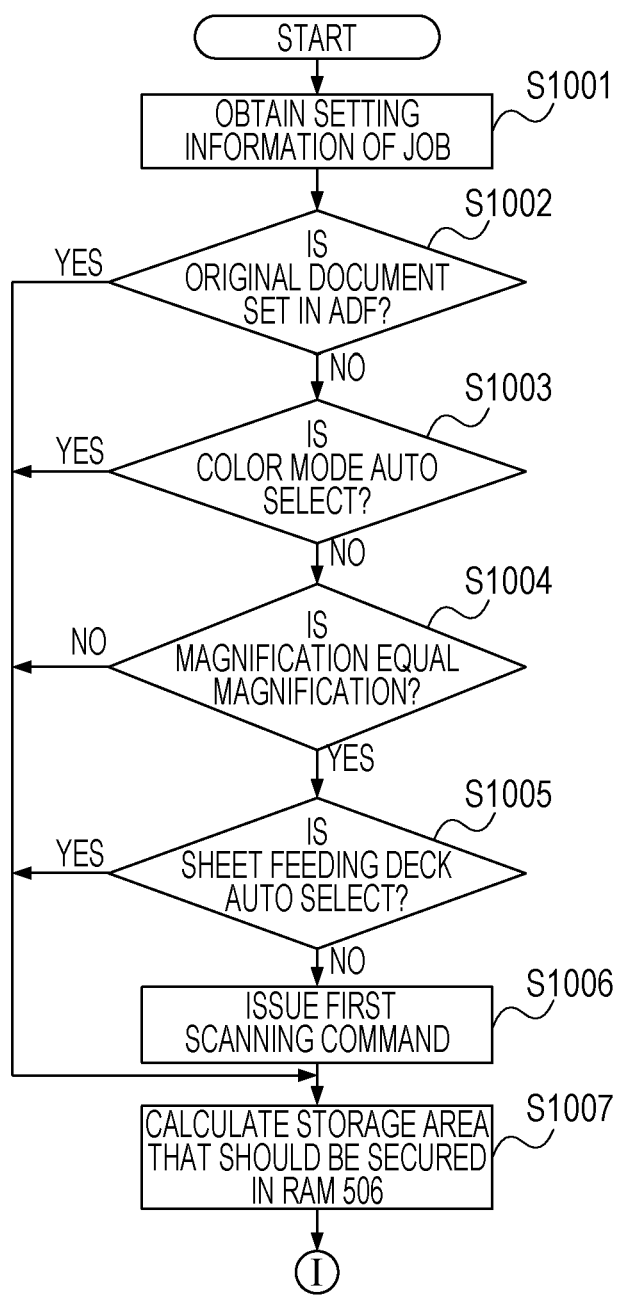
FIGS. 5A and 5B are flow charts for describing a control example according to the first exemplary embodiment.
Figure 5B:
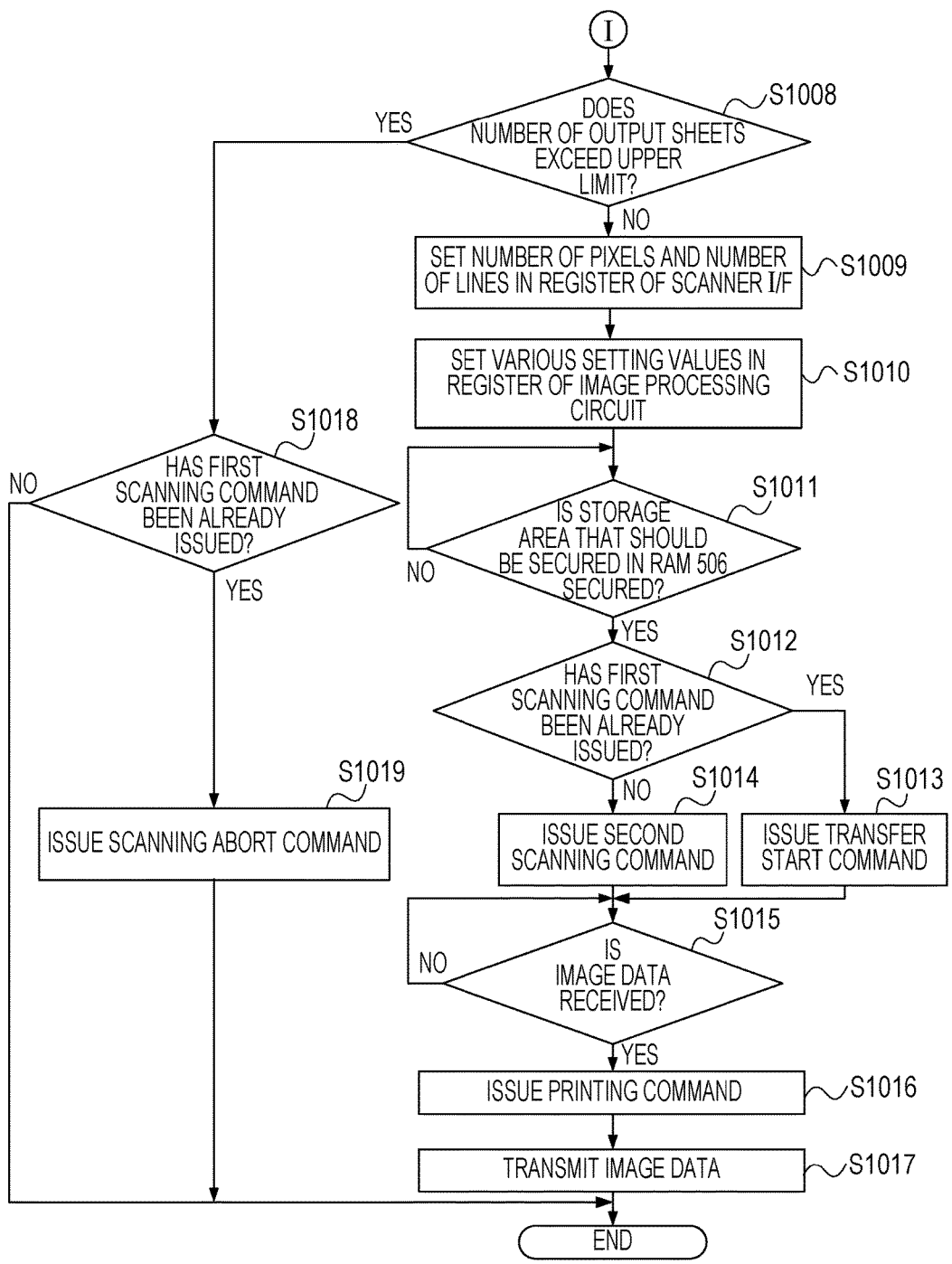

A detail of a series of processings will be described by using flow charts illustrated in FIGS. 5A and 5B in which an execution instruction of a copy job is accepted in the MFP 1000 according to the first exemplary embodiment, and the copy job where the execution instruction is accepted is executed. This processing is executed while the CPU 501 of the controller unit 500 executes the control program read out from the ROM 507 or the HDD 509 and decompressed to the RAM 506. It is noted that this processing is started in a state, for example, in which the copy screen illustrated in FIG. 4 is displayed on the display unit 710 and also in a case where the user presses the start key 721.

In S1001, the CPU 501 obtains various pieces of setting information for the copy job by referring to the setting information of the job stored in the HDD 509 and advances the processing to S1002.

In S1002, the CPU 501 determines whether or not the original document is set in the ADF. It is noted that a state in which the original document is set in the ADF can be determined on the basis of the detection by the original document detection sensor (not illustrated). When it is determined that the original document is set (that is, YES), the CPU 501 advances the processing to S1007. On the other hand, in a case where it is determined as NO, the CPU 501 advances the processing to S1003.

In S1003, the CPU 501 determines whether or not the color mode is auto select from the setting information of the job obtained in S1001. It is noted that the color mode is arbitrarily specified by the user with the color selection 712. A state in which the color mode is "auto select" means that the image data generated by reading the image of the original document is analyzed by the CPU 501 to determine whether the read original document is color or monochrome. On the other hand, in a case where the user previously specifies whether the read original document is "color" or "monochrome" with the color selection 712, the color mode is not auto select. In a case where it is determined as auto select (that is, YES), the CPU 501 advances the processing to S1007. On the other hand, in a case where it is determined as NO, the CPU 501 advances the processing to S1004.

In S1004, the CPU 501 determines whether or not the magnification is equal magnification. It is noted that the magnification is arbitrarily specified by the user with the magnification 713. A state in which the magnification is "equal magnification" refers to a case where the user specifies that the magnification is "100%", for example, or a case where the output sheet size is specified as A4 while the original document size is A4. On the other hand, a state in which the magnification is not "equal magnification" (that is, "variable magnification") refers to a case where the user specifies that the magnification is "86%", for example, or a case where the output sheet size is specified as A3 while the original document size is B4. In a case where it is determined as the equal magnification (that is, YES), the CPU 501 advances the processing to S1005. On the other hand, in a case where it is determined as NO, the CPU 501 advances the processing to S1007.

In S1005, the CPU 501 determines whether or not the sheet feeding deck is auto select. It is noted that the setting of the sheet feeding deck is arbitrarily selected by the user with the sheet selection 714. A state in which the sheet feeding deck is "auto select" means that a search is performed for one of the cassettes 351 to 354 that holds the sheet having the size matched with the output sheet size, and the sheet is fed from the cassette that holds the sheet having the size matched with the output sheet size. It is noted that the output sheet size is determined, for example, on the basis of the size of the read original document detected by the reflection-type sensors 220 and 221 and the magnification 713. On the other hand, a state in which the sheet feeding deck is not "auto select" refers to a case where, for example, one of the cassettes 351 to 354 and the manual feeding tray 350 for feeding the sheet to be output is previously specified by the user with the sheet selection 714. In a case where it is determined as auto select (that is, YES), the CPU 501 advances the processing to S1007. On the other hand, in a case where it is determined as NO, the CPU 501 advances the processing to S1006.

In S1006, the CPU 501 issues a first scanning command to the CPU 421 of the image reading unit 200 and advances the processing to S1007. It is noted that the first scanning command issued by the CPU 501 in S1006 is received by the image reading unit 200 in S2001 of FIG. 6 which will be described below.

In S1007, the CPU 501 calculates the size of the storage area that should be secured in the RAM 506 to store the image data generated by reading the image of the original document (e.g., the original document 32) and advances the processing to S1008. It is noted that the size of the storage area that should be secured to store the image data is calculated, for example, on the basis of the parameters such as the reading resolution, the magnification 713 (original document size/output sheet size), the original document size (reading size), and the color selection 712 (monochrome/color).

For example, in a case where the processing is advanced to S1007 after the processing in S1006 is performed, the original document size is limited (for example, a size smaller than or equal to SMALL (A4, LTR)). For this reason, in a case where the processing is advanced to S1007 after the processing in S1006 is performed, the CPU 501 uniquely determines the size of the storage area that should be secured to store the image data generated by reading the image of the original document (e.g., the original document 32) on the basis of the original document size. It is noted that, in a case where the processing is advanced to S1007 after the processing in S1006 is performed, the size for one page of the image data generated by reading the image of the original document (e.g., the original document 32) needs to be a size at which the storage in the image memory 429 can be performed.

On the other hand, in a case where the processing is advanced to S1007 without performing the processing in S1006, the original document size is not limited (for example, A5, SMALL (A4, LTR), LARGE (A3, LDR), extended (13×19), or long length). In a case where the processing is advanced to S1007 without performing the processing in S1006, the number of types of original document sizes is increased. For this reason, a plurality of tables for defining the size of the storage area that should be secured to store the image data generated by reading the image of the original document (e.g., the original document 32) are prepared for each image size. It is noted that the image size refers to a size calculated by multiplying the original document size by the magnification 713. Alternatively, the image size refers to a size calculated by multiplying a trimming size by the magnification 713. For example, a table in which the image size is "A5", a table in which the image size is "SMALL" (A4, LTR), a table in which the image size is "LARGE" (A3, LDR), a table in which the image size is "extended" (13×19), a table in which the image size is "long length", and the like are prepared. It is noted that the plurality of tables for defining the size of the storage area that should be secured to store the image data generated by reading the image of the original document are stored in the HDD 509. In view of the above, in a case where the processing is advanced to S1007 without performing the processing in S1006, the CPU 501 determines one table among the plurality of tables stored in the HDD 509 on the basis of the image size. Subsequently, the CPU 501 reads out the size of the storage area that should be secured to store the image data generated by reading the image of the original document (e.g., the original document 32) on the basis of the parameters including the reading resolution and the color selection 712 while the determined table is set as the target. It is noted that, in a case where the processing is advanced to S1007 without performing the processing in S1006, the size for one page of the image data generated by reading the image of the original document (e.g., the original document 32) is not necessary a size at which the storage in the image memory 429 can be performed. For example, in a case where the original document size is "LARGE", the magnification 713 is "variable magnification", and the color selection 712 is "color", the size for one page of the image data generated by reading the image of the original document may be a size at which the storage in the image memory 429 is not performed in some cases.

It is noted that, according to the present exemplary embodiment, the case has been described in which the size of the storage area that should be secured to store the image data is calculated by the CPU 501, but the configuration is not limited to this. The CPU 501 may obtain the size of the storage area that should be secured to store the image data from an external apparatus such as a PC.

In S1008, the CPU 501 determines whether or not the number of output sheets exceeds an upper limit. For example, in a case where the upper limit of the number of output sheets is 200 sheets, and the total number of sheets on which the printing has been performed so far is 198 sheets, since the total number exceeds the upper limit (200 sheets) of the number of output sheets when three sheets are newly printed by the execution of the copy job, the copying is not to be executed. When it is determined that the number of output sheets exceeds the upper limit (that is, YES), the CPU 501 advances the processing to S1018. On the other hand, in a case where it is determined as NO, the CPU 501 advances the processing to S1009.

In S1009, the CPU 501 sets the number of pixels and the number of lines in the register 800 of the scanner I/F 503 as illustrated in FIG. 8 and advances the processing to S1010.

In S1010, the CPU 501 sets various setting values (the color mode, the scaling factors in the X direction and the Y direction, the reading resolution, the output resolution, the rotation angle, the other function settings, and the like) in the register 900 of the image processing circuit 502 as illustrated in FIG. 9 and advances the processing to S1011.

In S1011, the CPU 501 determines whether or not the storage area calculated in S1007 is secured in the RAM 506. When it is determined that the storage area is secured (that is, YES), the CPU 501 advances the processing to S1012. On the other hand, the CPU 501 repeats the processing in S1011 until it is determined that the storage area is secured. In a case where the storage area calculated in S1007 is not secured even when a predetermined time elapses, the processing may be advanced to S1018 to abort the scanning. It is noted that, until the storage area is secured, the image data of the scanned original document is held by the image memory 429 of the image reading unit 200.

In S1012, the CPU 501 determines whether or not the first scanning command has been already issued. When it is determined that the command has been already issued (that is, YES), the CPU 501 advances the processing to S1013. On the other hand, in a case where it is determined as NO, the CPU 501 advances the processing to S1014.

In S1013, the CPU 501 issues a transfer start command to the CPU 421 of the image reading unit 200 to transmit (transfer) the image data stored in the image memory 429 to the controller unit 500 and advances the processing to S1015. It is noted that the transfer start command issued by the CPU 501 in S1013 is received by the image reading unit 200 in S2005 of FIG. 6 which will be described below.

In S1014, the CPU 501 issues a second scanning command to the CPU 421 of the image reading unit 200 and advances the processing to S1015. It is noted that the second scanning command issued by the CPU 501 in S1014 is received by the image reading unit 200 in S2001 of FIG. 6 which will be described below.

In S1015, the CPU 501 determines whether or not the image data transmitted (transferred) from the image reading unit 200 is received. It is noted that the image data received by the controller unit 500 in S1015 is transmitted by the image reading unit 200 in S2007 of FIG. 6 which will be described below. When it is determined that the image data is received (that is, YES), the CPU 501 advances the processing to S1016. On the other hand, in a case where it is determined as NO, the CPU 501 repeats the processing in S1015 until the image data is received.

In S1016, the CPU 501 issues a print command to the CPU 601 of the image forming unit 600 to print the image on the sheet on the basis of the image data received in S1015 and advances the processing to S1017. It is noted that the print command issued by the CPU 501 in S1016 is received by the image forming unit 600 in S3001 of FIG. 7 which will be described below.

In S1017, the CPU 501 transmits (transfers) the image data stored in the RAM 506 to the image forming unit 600. It is noted that, when the CPU 501 issues the second scanning command in S1014, the image data received from the image reading unit 200 is compressed by the compression and decompression unit 510 when being stored in the RAM 506 or the HDD 509 in S1015. In that case, after the compressed image data is decompressed by the compression and decompression unit 510, the CPU 501 transmits (transfers) this image data to the image forming unit 600. Subsequently, after the processing in S1017, the series of processings related to FIGS. 5A and 5B is ended.

In S1018, the CPU 501 determines whether or not the first scanning command has been already issued. When it is determined that the command has been already issued (that is, YES), the CPU 501 advances the processing to S1019. On the other hand, in a case where it is determined as NO, the CPU 501 ends the series of processings related to FIGS. 5A and 5B.

In S1019, the CPU 501 issues a scanning abort command for aborting the scanning to the CPU 421 of the image reading unit 200. It is noted that the scanning abort command issued by the CPU 501 in S1019 is received by the image reading unit 200 in S2005 of FIG. 6 which will be described below. Subsequently, after the processing in S1019, the series of processings related to FIGS. 5A and 5B is ended.

The detail of the series of processing for accepting the execution instruction of the copy job and executing the copy job where the execution instruction has been accepted in the MFP 1000 according to the first exemplary embodiment has been described above.

Figure 6:
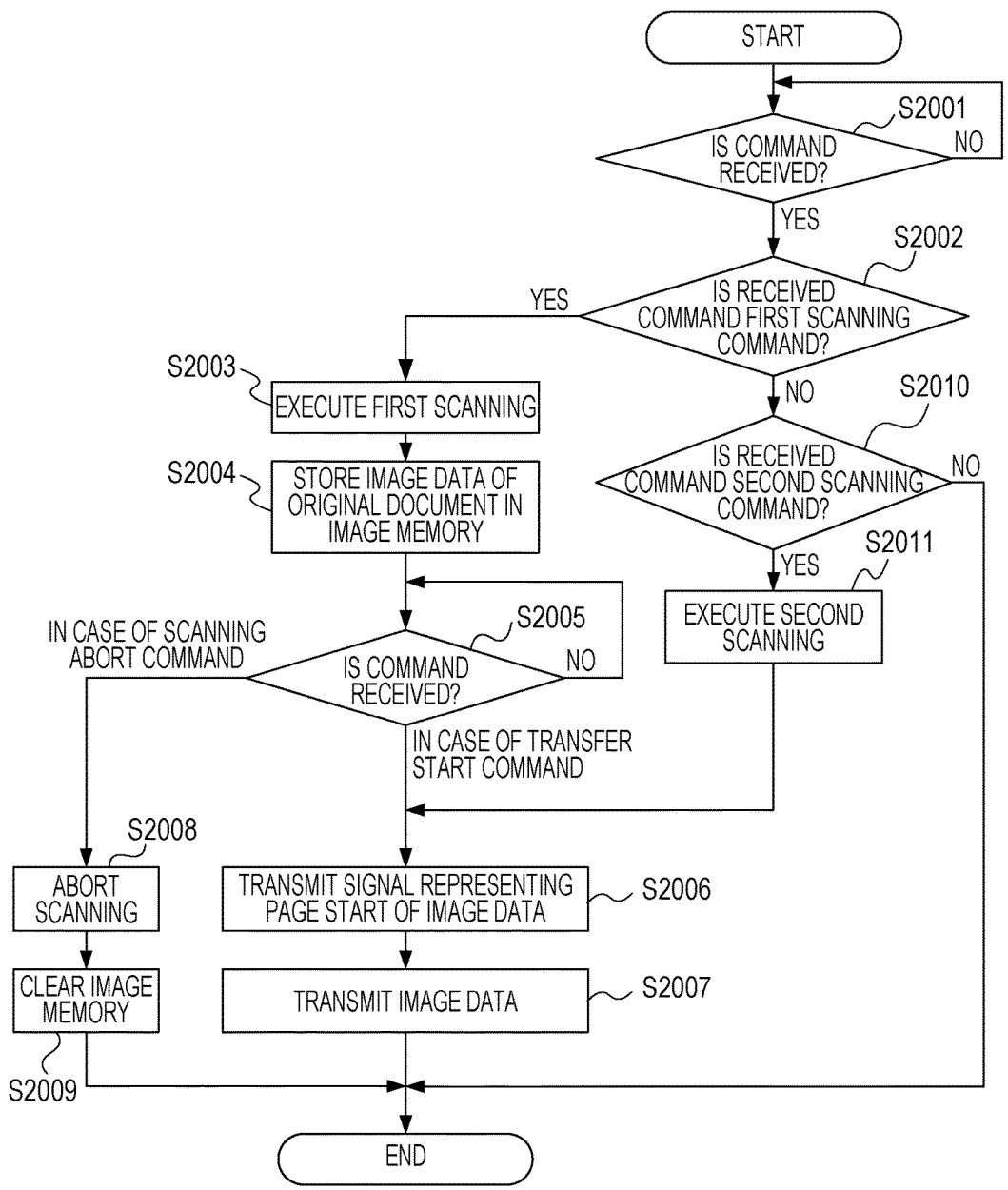
FIG. 6 is a flow chart for describing the control example according to the first exemplary embodiment.

Subsequently, a detail of a series of processings will be described by using a flow chart of FIG. 6 in which the first scanning command or the second scanning command is received, and the scanning is executed according to this reception in the MFP 1000 according to the first exemplary embodiment. This processing is performed while the CPU 421 of the image reading unit 200 executes the control program read out from the ROM 422 and decompressed to the RAM 423. It is noted that this processing is started in a state in which the original document is set on the document tray 30 or the platen glass 202.

In S2001, the CPU 421 determines whether or not the command is received. It is noted that the command received by the CPU 421 in S2001 is the first scanning command issued by the controller unit 500 in S1006 of FIG. 5A described above, the second scanning command issued by the controller unit 500 in S1014 of FIG. 5B, or the like. When it is determined that the command is received (that is, YES), the CPU 421 advances the processing to S2002. On the other hand, in a case where it is determined as NO, the CPU 421 repeats the processing in S2001 until the command is received.

In S2002, the CPU 421 determines whether or not the received command is the first scanning command. When it is determined that the command is the first scanning command (that is, YES), the CPU 421 advances the processing to S2003. On the other hand, in a case where it is determined as NO, the CPU 421 advances the processing to S2010.

In S2003, the CPU 421 reads the image of the original document to generate the image data and performs a control to execute a series of processings (first scanning) for storing the generated image data in the image memory 429. Then, the CPU 421 advances the processing to S2004.

In S2004, the CPU 421 stores the image data generated by the scanning executed in S2003 in the image memory 429 and advances the processing to S2005. It is noted that a case where the processing in S2004 is performed is relevant to a case where the processing is advanced to S1007 after the processings in S1002 to S1006 are performed in one or more embodiments. In this case, the data size of the image data generated by the scanning executed in S2003 is small. For this reason, the image data for at least one page can be stored in the image memory 429 while overflow does not occur in the image memory 429. That is, in a case where the transfer start command issued in S1013 is delayed, the image data for one page is all stored and held in the image memory 429.

In S2005, the CPU 421 determines whether or not the command is received. It is noted that the command received by the CPU 421 in S2005 is the transfer start command issued by the controller unit 500 in S1013 of FIG. 5B described above or the scanning abort command issued by the controller unit 500 in S1019 of FIG. 5B. In a case where the transfer start command is received, the CPU 421 advances the processing to S2006. On the other hand, in a case where the scanning abort command is received, the CPU 421 advances the processing to S2008.

In S2006, the CPU 421 transmits the signal representing the page start of the image data to the controller unit 500 to transmit (transfer) the image data of the scanned original document to the controller unit 500 and advances the processing to S2007.

In S2007, the CPU 421 transmits the image data of the scanned original document to the controller unit 500. It is noted that, in a case where the first scanning is executed, the CPU 421 reads out the image data stored in the image memory 429 and transmits this image data to the controller unit 500. Subsequently, after the processing in S2007, the series of processings related to FIG. 6 is ended.

In S2008, the CPU 421 issues an instruction to abort the execution of the scanning and advances the processing to S2009.

In S2009, the CPU 421 clears the image data stored in the image memory 429 (the image data of the scanned original document). Subsequently, after the processing in S2009, the series of processings related to FIG. 6 is ended.

In S2010, the CPU 421 determines whether or not the received command is the second scanning command. When it is determined that the command is the second scanning command (that is, YES), the CPU 421 advances the processing to S2011. On the other hand, in a case where it is determined as NO, the CPU 421 executes the other processing as needed, and the series of processings related to FIG. 6 is ended.

In S2011, the CPU 421 executes a series of processings (the second scanning) for reading the image of the original document to generate the image data and transmitting (transferring) the generated image data to the controller unit 500, and the processing is advanced to S2006 described above. It is noted that the image data of the original document is not stored in in the image memory 429 but is directly transmitted (transferred) to the controller unit 500 in the second scanning.

The detail of the series of processings has been described above in which the first scanning command or the second scanning command is received, and the scanning is executed according to this reception in the MFP 1000 according to the first exemplary embodiment.

Figure 7:
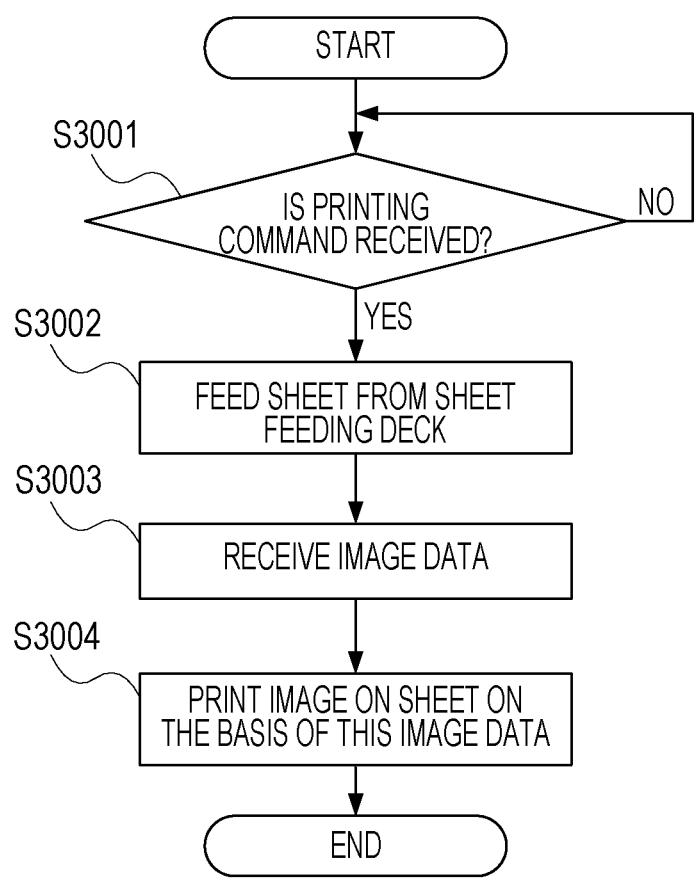
FIG. 7 is a flow chart for describing the control example according to the first exemplary embodiment.

Subsequently, a detail of a series of processings will be described by using a flow chart illustrated in FIG. 7 in which the print command is received, and the image is printed on the sheet according to this reception in the MFP 1000 according to the first exemplary embodiment. This processing is performed while the CPU 601 of the image forming unit 600 executes the control program read out from the ROM 507 or the HDD 509 and decompressed to the RAM 506.

In S3001, the CPU 601 determines whether or not the print command is received. It is noted that the print command received by the CPU 601 in S3001 is issued by the controller unit 500 in S1016 of FIG. 5B described above. When it is determined that the print command is received (that is, YES), the CPU 601 advances the processing to S3002. On the other hand, in a case where it is determined as NO, the CPU 601 repeats the processing in S3001 until the print command is received.

In S3002, the CPU 601 issues an instruction to feed the sheet for printing from the sheet feeding deck (351 to 354, 350) specified by the user with the sheet selection 714 or the sheet feeding deck (351 to 354) determined by the auto select and advances the processing to S3003.

In S3003, the CPU 601 receives the image data from the controller unit 500 and advances the processing to S3004. It is noted that the image data received by the CPU 601 in S3003 is transmitted (transferred) by the controller unit 500 in S1017 of FIG. 5B described above.

In S3004, the CPU 601 issues an instruction to print the image on the sheet 301 on the basis of the image data received in S3003. Subsequently, after the processing in S3004, the series of processings related to FIG. 7 is ended.

The detail of the series of processings for printing the image on the sheet in accordance with the reception of the print command in the MFP 1000 according to the first exemplary embodiment has been described above.

As described above, when the execution instruction of the copy job is accepted, the reading of the image of the original document can be started without waiting for a situation where the storage area for storing the image data generated by reading the image of the original document is secured in the RAM 506. Subsequently, in accordance with a situation where this storage area is secured in the RAM 506, the image data generated by the reading is transferred from the image memory 429 to the RAM 506. That is, since the reading of the image of the original document (e.g., the original document 32) can be executed ahead of a period in which the determination related to the execution condition of the job as to whether or not the number of output sheets exceeds the upper limit or the like, the various settings with respect to the image processing circuit 502 of the controller unit 500, and the like are performed, it is possible to shorten the FCOT.

Various examples and exemplary embodiments of the present disclosure have been described above, but the gist and the scope of the present invention(s) should not be limited to the specific descriptions in the present specification for a person skilled in the art.

For example, according to the present exemplary embodiment, the case has been described where the CPU 501 does not issue the first scanning command in a case where the original document is set in the ADF 100, but the configuration is not limited to this. Even in a case where the original document is set in the ADF 100, the CPU 501 may issue the first scanning command when the copy settings such as the color mode, the magnification, and the sheet feeding deck satisfy a predetermined condition. In addition, the case has been described where the CPU 501 issues the first scanning command in a case where the copy settings such as the color mode, the magnification, and the sheet feeding deck satisfy the predetermined condition, but the configuration is not limited to this. A further restriction may be set such that the CPU 501 can issue the first scanning command in a case where the other copy settings such as settings of the reading resolution and the post processings satisfy a predetermined condition. Alternatively, a mode in which the copy settings such as the color mode, the magnification, and the sheet feeding deck are fixed (referred to as FCOT shortened mode) can be directly specified from the operation unit 505 by the user. Subsequently, the CPU 501 may issue the first scanning command in a case where the FCOT shortened mode is specified by the user.

In addition, according to the present exemplary embodiment, the descriptions have been given while the PC is exemplified as the external apparatus, but a mobile information terminal such as a PDA or a smart phone, a network connecting device, an external dedicated-use apparatus or the like may be used instead.

In addition, according to the present exemplary embodiment, the CPU 501 of the controller unit 500 of the MFP 1000 functions as the main body for the above-described various controls, but a configuration may be adopted in which a part or all of the above-described various controls can be executed by a printing control apparatus such as an external controller corresponding to a separate package from the MFP 1000.

In addition, according to the present exemplary embodiment, the case has been described in which the controller unit 500 of the MFP 1000 is provided with the CPU 501, the image reading unit 200 is provided with the CPU 421, and the image forming unit 600 is provided with the CPU 601, but the configuration is not limited to this. The configuration in which the image reading unit 200 is provided with the CPU 421 is not a necessary configuration as long as the CPU 501 of the controller unit 500 can control the image reading unit 200 and the image forming unit 600 in an overall manner, and also, the configuration in which the image forming unit 600 is provided with the CPU 601 is not a necessary configuration.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-174493, filed Aug. 28, 2014, and Japanese Patent Application No. 2015-140044, filed Jul. 13, 2015, which are hereby incorporated by reference herein in their entireties.

What is claimed is:

1. A reading apparatus comprising:
a reading device configured to read an image of an original document and generate image data;
a first memory configured to store the image data generated by the reading device;
a second memory configured to store the image data transferred from the first memory; and
at least one processor that operates to:
determine whether there is a storage area corresponding to data size of the image data generated by the reading device in the second memory; and
cause the reading device to start reading the image of the original document before the determination is completed,
wherein the image data is not transferred from the first memory to the second memory before the determination is completed, and
wherein the image data is transferred from the first memory to the second memory after it is determined that there is the storage area corresponding to data size of the image data generated by the reading device in the second memory.

2. A reading apparatus comprising:
a reading device configured to read an image of an original document and generate image data;
a first memory configured to store the image data generated by the reading device;
a second memory configured to store the image data transferred from the first memory;
an image processor configured to process the image data in accordance with setting values set in a register; and
at least one processor that operates to:
set the setting values for processing the image data in the register; and
cause the reading device to start reading the image of the original document before setting of the setting values is completed,
wherein the image data is not transferred from the first memory to the second memory before the setting of the setting values is completed, and
wherein the image data is transferred from the first memory to the second memory after the setting of the setting values is completed.

3. The reading apparatus according to claim 2, wherein the at least one processor causes the reading device to start reading the image of the original document before the setting of the setting values is completed in a case where setting information of a job is matched with a specific condition, and
wherein the at least one processor causes the reading device to start reading the image of the original document after the setting of the setting values is completed in a case where the setting information of the job is not matched with the specific condition.

4. The reading apparatus according to claim 2, further comprising
a printer configured to print an image based on the image data,
wherein the specific condition is a condition to satisfy at least one of a state in which the reading device moves a reader to read an image of an original document placed on a document positioning plate and a state in which a size of the original document from which the image is read by the reading device is matched with a size at which the image is printed by the printer.

5. The reading apparatus according to claim 2, wherein the at least one processor is further configured to specify the data size of the image data generated by the reading device based on setting information of a job.

6. The reading apparatus according to claim 5, wherein the at least one processor specifies the data size of the storage area of the image data generated by the reading device based on at least one of a resolution at which the image of the original document is read by the reading device, a color mode of the image data generated by the reading device, a size of the original document from which the image is read by the reading device, and a size of a sheet on which the printing is performed by the printer.

* * * * *